United States Patent
Heta et al.

(10) Patent No.: US 6,960,383 B2
(45) Date of Patent: Nov. 1, 2005

(54) COMBINED BOARDS AND METHODS FOR MANUFACTURING THE SAME

(75) Inventors: Hitoshi Heta, Toyota (JP); Tamotsu Nagaya, Toyota (JP); Toshiaki Kondo, Okazaki (JP); Masahiko Uchida, Okazaki (JP); Makoto Suzuki, Okazaki (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 163 days.

(21) Appl. No.: 10/358,766

(22) Filed: Feb. 5, 2003

(65) Prior Publication Data

US 2003/0170422 A1    Sep. 11, 2003

(30) Foreign Application Priority Data

Feb. 6, 2002  (JP)  ............................. 2002-029905

(51) Int. Cl.[7] .............................. B32B 3/24; F16B 5/08
(52) U.S. Cl. ...................... 428/139; 429/140; 403/269; 403/265; 403/268; 403/270; 264/248; 264/263; 156/308.4; 156/293
(58) Field of Search .............................. 428/139, 140; 403/269, 265, 268, 270; 264/248, 263; 156/308.4, 156/293

(56) References Cited

U.S. PATENT DOCUMENTS 5,190,803 A * 3/1993 Goldbach et al. ........... 428/138
5,197,935 A   3/1993 Schweri
5,393,164 A * 2/1995 Renner et al. .............. 403/271

FOREIGN PATENT DOCUMENTS

| DE | 19500790 A | 7/1996 |
| GB | 893375 A | 4/1962 |
| JP | 04331115 | 11/1992 |
| JP | 06339946 | 12/1994 |
| JP | 10044247 | 2/1998 |
| JP | 11-208271 | 8/1999 |
| WO | WO 79/00184 A | 4/1979 |

* cited by examiner

Primary Examiner—William P. Watkins, III
(74) Attorney, Agent, or Firm—Patterson, Thuente, Skaar & Christensen, P.A.

(57) ABSTRACT

Combined boards are taught that comprise a second board substrate (12) having a through bore (14) formed therein, a first board substrate (10), and a connector pin (40, 50) received in the through bore (14) of the second board substrate (12). The first and second board substrates overlap such that the through bore (14) of the second board substrate (12) is covered by a first surface (10b) of the first board substrate (10). The connector pin is fusion bonded to a circumferential surface of the through bore (14) and the first surface (10b) of the first board substrate (10).

8 Claims, 3 Drawing Sheets

COMBINED BOARDS AND METHODS FOR MANUFACTURING THE SAME

This application claims priority to Japanese Patent Application Serial Number 2002-029905, the contents of which are incorporated herein by reference.

BACKGROUND OF THE INVENTION

1. Field of the Invention

The present invention relates to combined boards and methods for manufacturing the same. More particularly, the present invention relates to combined boards, e.g., vehicle trims, that comprise two substrates that are arranged to form an overlap portion and connected to each other in the overlap portion, and methods for manufacturing the same.

2. Description of the Related Art

A method for manufacturing a combined board is taught, for example, by Japanese Laid-open Patent Publication Number 11-208271, in which a vehicle trim is exemplified as the combined board. In this known art, the vehicle trim comprises first and second trim substrates made from a synthetic resin. The first (lower) trim substrate integrally includes a projection or pin that extends from its inner surface. On the other hand, the second (upper) trim substrate is formed with an aperture that is adapted to receive the pin when the first and second trim substrates are partly overlapped. The first and second trim substrates thus constructed are arranged to form an overlap portion and the pin of the first trim substrate is inserted into the aperture of the second trim substrate. Thereafter, the pin is heated from an inner side of the second trim substrate in order to melt its projecting end, thereby forming a caulked joint portion in the overlap portion. As a result, these trim substrates are connected to each other in the overlap portion, thereby producing the vehicle trim.

However, because the pin of the first trim substrate is not bonded to the aperture of the second trim substrate, the caulked joint portion in this known method may lack connecting force. In addition, such a caulked joint portion may produce looseness on the joint portion. As a result, the trim substrates cannot be desirably or sufficiently connected each other. Such insufficient connection may lead to inferior quality of the produced combined board.

In another known method for manufacturing a combined board, two substrates are arranged to form an overlap portion and are simply adhered to each other in the overlap portion by utilizing adhesives, thereby forming a combined board.

However, this known technique typically increases costs for manufacturing the combined board, because the adhesives are relatively expensive. In addition, labor-intensive and time consuming work is required to form the combined board, because relatively long time is required for the adhesives to completely set.

SUMMARY OF THE INVENTION

It is, accordingly, one object of the present teachings to provide improved methods for manufacturing a combined board.

For example, in one aspect of the present teachings, combined boards are taught that comprise a first board substrate, a second board substrate having a through bore formed therein, and a connector pin received in the through bore of the second board substrate. In these combined boards, the first and second board substrates may overlap such that the through bore of the second board substrate is covered by a first surface of the first board substrate. Further, the connector pin may be fusion bonded to a circumferential surface of the through bore and the first surface of the first board substrate.

In these combined boards, because the connector pin may be fusion bonded to the circumferential surface of the through bore and the first surface of the first board substrate, the connected portion may have relatively strong connecting force. In addition, the connected portion does not produce looseness on the connected portion. As a result, the board substrates can be desirably or suitably connected to each other.

Further, in another aspect of the present teachings, methods are taught for manufacturing a combined board that comprises first and second board substrates. In these methods, a through bore may first be formed in the second board substrate. Thereafter, the first and second board substrates may overlap such that the through bore of the second board substrate is covered by a first surface of the first board substrate. Subsequently, a molding material may be fed into the through bore of the second board substrate, thereby forming a connector pin therein. The connector pin may be fusion bonded to a circumferential surface of the through bore and the first surface of the first board substrate.

In this case, the molding materials can be quickly set within a relatively short time. Therefore, labor-intensive and time consuming work is not required to form the combined board. In addition, because the molding material is generally less expensive than adhesives, costs for manufacturing the combined board can be considerably reduced.

Other objects, features and advantage of the present invention will be ready understood after reading the following detailed description together with the accompanying drawings and the claims.

DETAILED DESCRIPTION OF THE INVENTION

In one embodiment of the present teachings, a combined board that comprises first and second board substrates is manufactured. For example, a through bore may first be formed in the second board substrate. Thereafter, the first and second board substrates may overlap such that the through bore of the second board substrate is covered by a first surface of the first board substrate, thereby forming an overlap portion between the first and second board substrate. Subsequently, a molding material may be fed into the through bore of the second board substrate, thereby forming a connector pin in the through bore. The connector pin may be fusion bonded to a circumferential surface of the through bore and the first surface of the first board substrate. As a result, the first and second are connected in the overlap portion, thereby producing the combined board.

Optionally, the connector pin may be fusion bonded to a first surface of the second board substrate around the through bore at the same time that the connector pin is fusion bonded to the circumferential surface of the through bore and the first surface of the first board substrate. Preferably, the molding material may comprise the same synthetic resin as the synthetic resin that is contained in the first and second board substrates.

During the molding material feeding step, a connector pin forming recess of a molding die may engage the through bore, thereby forming a connector pin forming cavity therebetween. Thereafter, the molding material may be fed into the connector pin forming cavity, so that the connector pin is formed in the connector pin forming cavity. Optionally, the connector pin may comprise a head portion and the head portion may be fusion bonded to the first surface of the second board substrate around the through bore.

In another optional embodiment, the molding material may be fed into the through bore at a position that is closer to the first surface of the first board substrate than the first surface of the second board substrate. Therefore, the connector pin can be strongly bonded to the first surface of the first board substrate.

Two detailed representative embodiments of the present teachings will now be described in further detail with reference to FIGS. 1 to 5. A vehicle door trim 1 (FIG. 1) will be exemplified as a representative combined board that can be prepared utilizing the present teachings.

First Detailed Representative Embodiment

Figure 1:
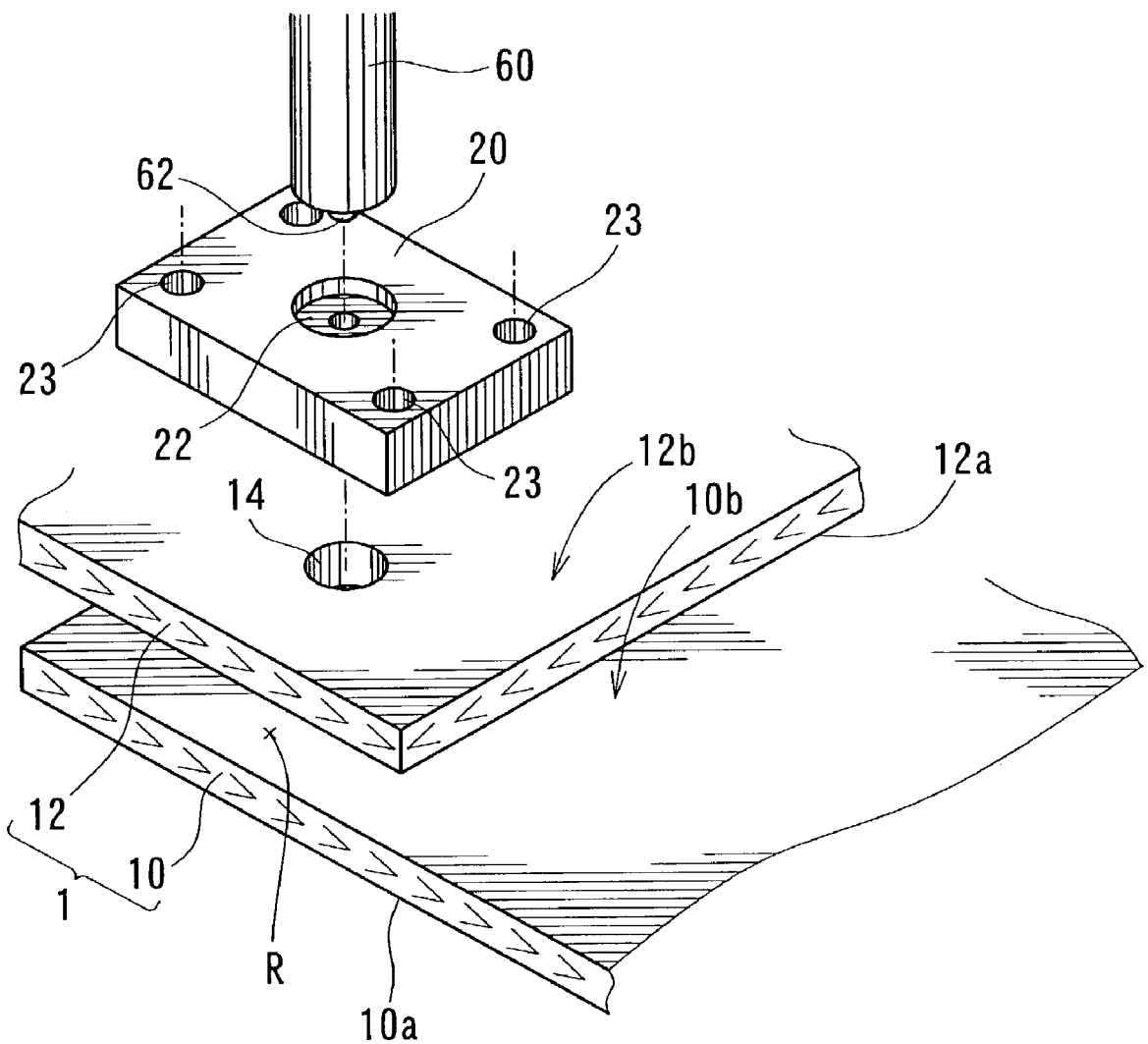
FIG. 1 is a schematic perspective view illustrating a representative apparatus for manufacturing a door trim according to a first embodiment of the present teachings.

The first detailed representative embodiment will now described with reference to FIGS. 1 to 3. As shown in FIG. 1, the representative door trim 1 may include a first (lower) plate-shaped trim substrate 10 and a second (upper) plate-shaped trim substrate 12. Each of these substrates 10, 12 is preferably made from a composite material containing wood-based natural fibers, e.g., kenaf fiber, and synthetic resin fibers, e.g., polypropylene (PP) fiber. Further, teachings concerning appropriate composite materials can be found in WO 02/26877 A2 and WO 02/27091 A2, which are incorporated herein by reference. The first trim substrate 10 has a first or inner surface 10b and a second or outer surface 10a. Similarly, the second trim substrate 12 has a first or inner surface 12b and a second or outer surface 12a. Typically, the outer surfaces 10a, 12a of the first and second trim substrates 10, 12 may define an ornamental surface of the door trim 1. The first and second trim substrates 10, 12 are partly overlapped, thereby forming an overlap portion R therebetween. Further, these trim substrates 10, 12 are appropriately positioned such that the inner surface 10b of the first trim substrate 10 partly contacts the outer surface 12a of the second trim substrate 12. These trim substrates 10, 12 are connected in the overlap portion R by a special connecting method that utilizes an injection molding machine (not shown), which method will be described below.

As was described above, the door trim 1 is preferably manufactured by partly overlapping the trim substrates 10, 12 and connecting the same in the overlap portion R. Further details concerning representative connecting techniques will now be described.

Known injection molding machines may be used to connect the trim substrates 10, 12 and preferably include a barrel 60 and a molding die 20. The barrel 60 contains molten molding materials or synthetic resin materials (e.g., PP) therein and includes an inner injection plunger (not shown) for injecting the molding materials. A rounded injection tip 62 is disposed at the distal end of the barrel 60. The upper surface of the molding die 20 includes a barrel coupling recess 22 and a connector pin forming recess 26 is defined on its lower surface. As best shown in FIG. 2, the barrel coupling recess 22 is shaped so as to closely receive the distal end of the barrel 60 as well as the injection tip 62. That is, the barrel coupling recess 22 has a shape that is complementary to the distal end of the barrel 60 as well as the injection tip 62. The barrel coupling recess 22 communicates with the connector pin forming recess 26 via a feeder passage 24. In addition, the molding die 20 has a plurality of through bores 23. The molding die 20 is attached to the injection molding machine by utilizing the through bores 23 and connecting bolts (not shown), and the distal end of the barrel 60 is coupled to the barrel coupling recess 22.

A representative method for manufacturing the door trim 1 using this injection molding machine will now be described.

First, the second trim substrate 12 is formed with a desired number of through bores 14 (one of which is shown for illustration purposes) along its periphery. Preferably, the through bore 14 has a diameter smaller than the pin forming recess 26 that is defined in the molding die 20. Thereafter, the first trim substrate 10 is placed on the second trim substrate 12, thereby forming the overlap portion R therebetween. At this time, these trim substrates 10, 12 are appropriately positioned so that the through bore 14 of the second trim substrate 12 may be covered or closed by the inner surface 10b of the first trim substrate 10. Next, the overlapping trim substrates 10, 12 are positioned under the injection molding machine such that the through bore 14 of the second trim substrate 12 is aligned with the connector pin forming recess 26 of the molding die 20. Subsequently, the injection molding machine is moved toward the overlap portion R, so that the lower surface of the molding die 20 contacts the inner surface 12b of the second trim substrate 12. As a result, the connector pin forming recess 26 engages the through bore 14. Thus, a pin forming cavity may be defined by the pin forming recess 26 of the molding die 20, the inner surface 12b of the second trim substrate 12, a circumferential surface of the through bore 14 and the inner surface 10b of the first trim substrate 10. As will be appreciated, the pin forming cavity may preferably have a T-shape in cross section.

Subsequently, the injection molding machine is actuated in order to operate the injection plunger in the barrel 60, thereby ejecting the molding materials from the injection tip 62. As a result, the ejected molding materials are fed into the pin forming cavity via the feeder passage 24. As will be recognized, the molding material may preferably be continuously injected into the pin forming cavity until the pin forming cavity is completely filled with the molding material. The molding materials fed into the pin forming cavity are then cooled and set, thereby forming a headed connector pin 40 that includes a flanged head portion 44 and a shank portion 42. Thus, the first and second trim substrates 10, 12 are connected each other by the connector pin 40 in the overlap portion R, thereby forming the door trim 1.

Figure 2:
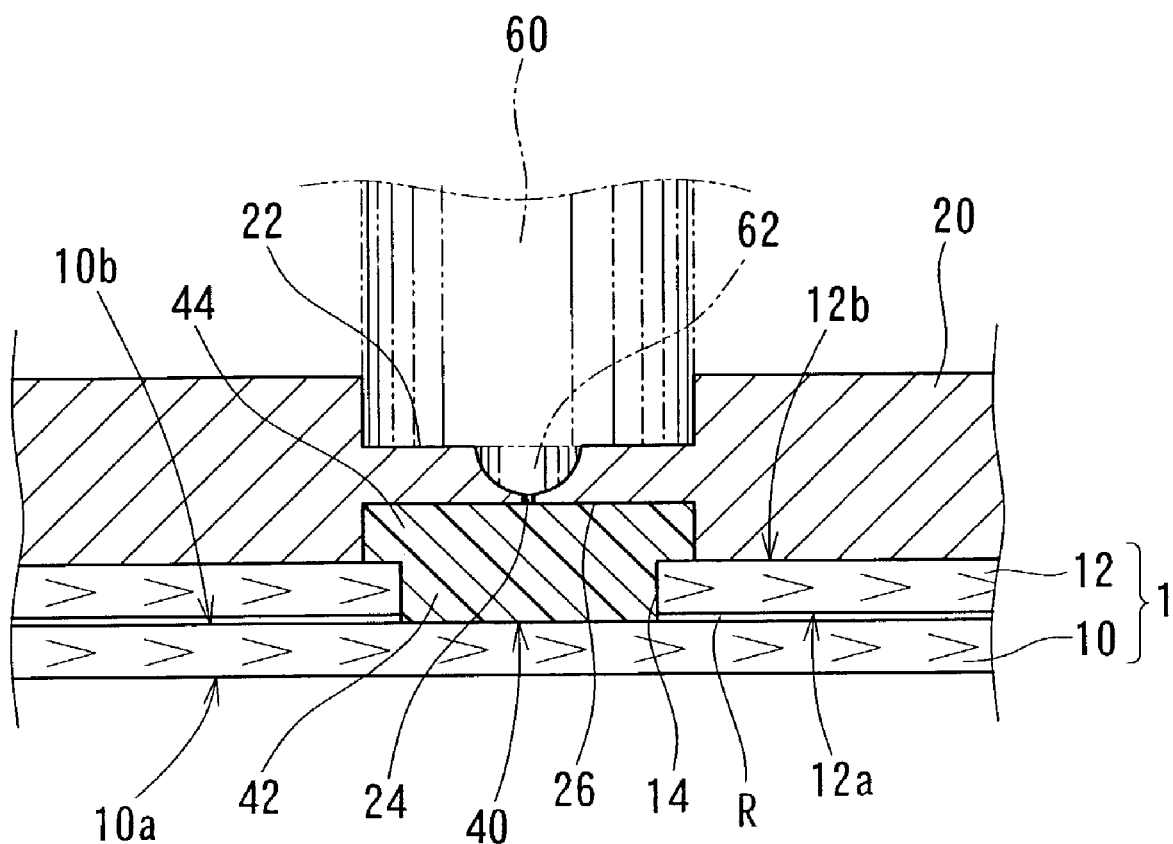
FIG. 2 is a cross-sectional view of a connected portion of the door trim according to the first embodiment of the present teachings.
Figure 3:
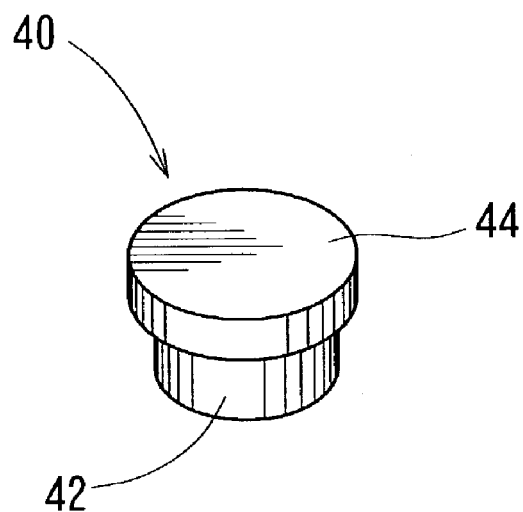
FIG. 3 is a perspective view of a connector pin that is used in the first embodiment of the present teachings.

As shown in FIGS. 2 and 3, the head portion 44 of the connector pin 40 has an annular-shaped lower surface, which lower surface is fusion bonded to the inner surface 12b of the second trim substrate 12. Further, the shank portion 42 of the connector pin 40 has a cylindrical side annular surface and a circular lower end surface, which surfaces are fusion bonded to the circumferential surface of the through bore 14 and the inner surface 10b of the first trim substrate 10, respectively. Thus, the connector pin 40 is effectively bonded or adhered to both of the first and second trim substrates 10, 12. In addition, because the molten molding materials fed into the pin forming cavity can fuse with the synthetic resin (PP) contained in the trim substrates 10, 12, the connector pin 40 can be tightly integrated with the trim substrates 10, 12. Therefore, the first and second trim substrates 10, 12 can be reliably or suitably connected to each other in the overlap portion R.

The present method may considerably reduce costs for manufacturing the door trim 1, because the molding materials (PP) are less expensive than typical adhesives. In addition, labor-intensive and time consuming work is not required to form the door trim 1, because the molding materials can be quickly set within a short time, typically about 12–20 seconds, on the other hand. On the other hand, adhesives usually require a relatively long time to set, typically about 24 hours.

Second Detailed Representative Embodiment

Figure 4:
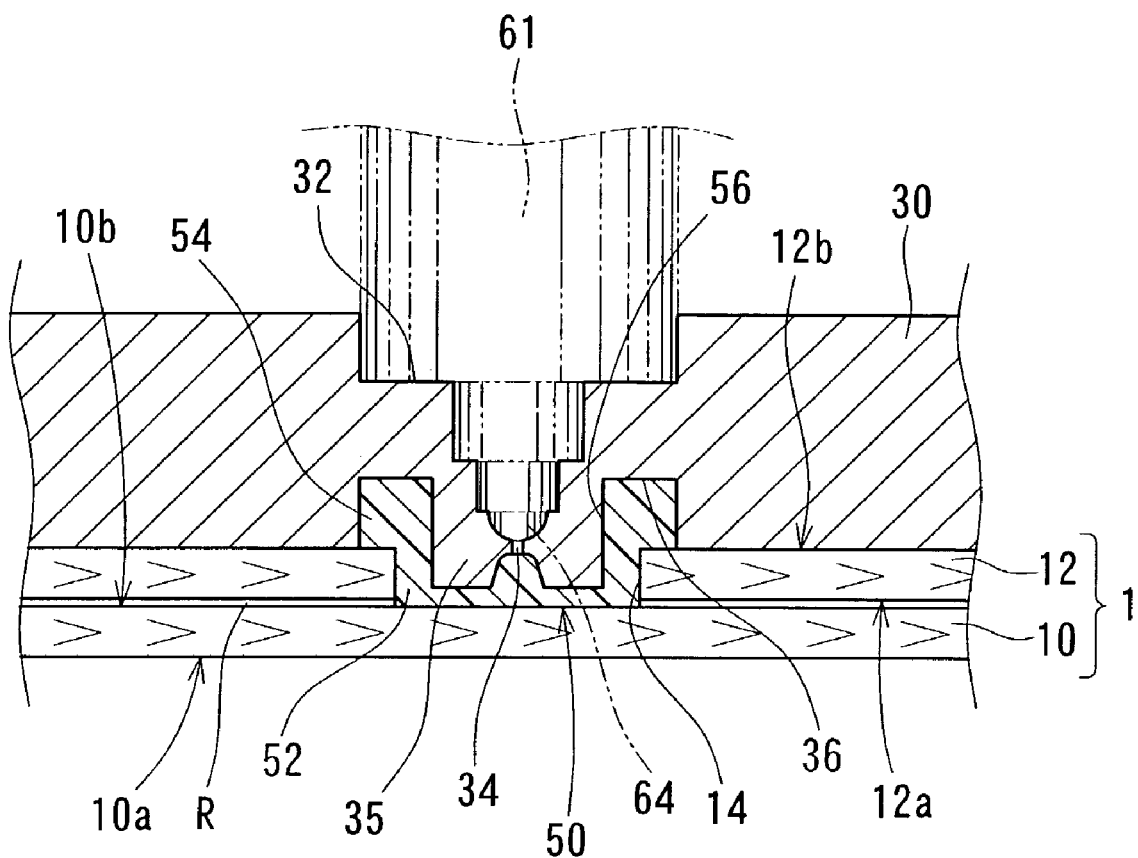
FIG. 4 is a cross-sectional view of a connected portion of a door trim according to a second embodiment of the present teachings.
Figure 5:
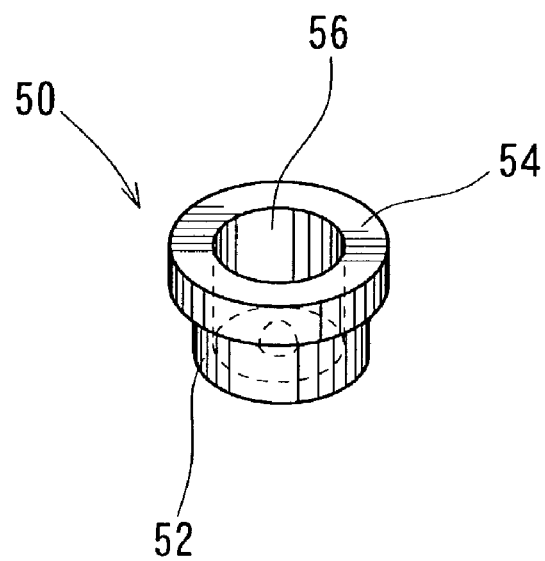
FIG. 5 is a perspective view of a connector pin that is used in the second embodiment of the present teachings.

The second detailed representative embodiment will now described with reference to FIGS. 4 and 5. Because the second embodiment relates to the first embodiment, only constructions and elements that are different from the first embodiment will be explained in detail. Elements that are the same in the first and second embodiments will be identified by the same reference numerals and detailed description of such elements will be omitted.

In this embodiment, the injection molding machine for connecting the trim substrates 10, 12 includes a barrel 61 and a molding die 30. An extended rounded injection tip 64 is disposed at the distal end of the barrel 60. An upper surface of the molding die 30 includes a shouldered barrel coupling recess 32 and a lower surface of the molding die 30 includes a connector pin forming recess 36. As shown in FIG. 4, the barrel coupling recess 32 is shaped so as to closely receive the distal end of the barrel 61 as well as the injection tip 64. Further, the connector pin forming recess 36 includes a central cylindrical projection 35 that extends from a bottom wall thereof. As a result, unlike the connector pin forming recess 26 of the first embodiment, the connector pin forming recess 36 may have an annular shape. Further, as shown in FIG. 4, the barrel coupling recess 32 extends into the projection 35 disposed in the recess 36. The barrel coupling recess 32 communicates with the connector pin forming recess 36 via a feeder passage 34. As will be appreciated, unlike the first embodiment, the feeder passage 34 is substantially positioned in an imaginary plane containing the lower surface of the molding die 30. Preferably, the feeder passage 34 is appropriately positioned such that the minimum distance between the feeder passage 34 and the inner surface 10b of the first trim substrate 10 is less than the minimum distance between the feeder passage 34 and the inner surface 12b of the second trim substrate 12 when the lower surface of the molding die 30 contacts the inner surface 12b of the second trim substrate 12 at the overlap portion R.

A representative method for manufacturing the door trim 1 using this injection molding machine will now be described.

Similar to the first embodiment, the first trim substrate 10 is placed on the second trim substrate 12, thereby forming the overlap portion R therebetween. Next, the overlapping trim substrates 10, 12 are positioned under the injection molding machine such that the through bore 14 of the second trim substrate 12 is aligned with the connector pin forming recess 36 of the molding die 30. Subsequently, the extrusion molding machine is moved, so that the lower surface of the molding die 30 contacts the inner surface 12b of the second trim substrate 12. Thus, a pin forming cavity may be defined by the pin forming recess 36 of the molding die 30, the projection 35, the through bore 14 of the second trim substrate 12 and the inner surface 10b of the first trim substrate 10. As will be appreciated, the pin forming cavity may preferably have a U-shape in cross section.

Subsequently, similar to the first embodiment, the injection molding machine is actuated in order to operate the injection plunger in the barrel 61, thereby injecting the molding materials from the injection tip 64. As a result, the ejected molding materials are fed into the pin forming cavity via the feeder passage 34. The molding materials fed into the pin forming cavity are then cooled and set, thereby forming a headed connector pin 50 having an annular head portion 54 and a hollow shank portion 52. Unlike the first embodiment, the connector pin 50 includes a bottomed recess 56 formed by the projection 35. Thus, the first and second trim substrates 10, 12 are connected to each other by the connector pin 50 in the overlap portion R, thereby forming the door trim 1.

Similar to the first embodiment, the connector pin 50 is effectively bonded or adhered to the first and second trim substrates 10, 12. Therefore, the first and second trim substrates 10, 12 can be reliably or suitably connected to each other in the overlap portion R. In addition, as shown in FIGS. 4 and 5, according to this embodiment, the molding materials are injected in a position that is closer to the inner surface 10b of the first trim substrate 10 than the inner surface 12b of the second trim substrate 12, because the feeder passage 34 is arranged as described above. Therefore, the molding materials are fed toward the inner surface 10b of the first trim substrate 10 under high pressure. As a result, the connection pin 50 may be strongly bonded or adhered to the inner surface 10b of the first trim substrate 10. Thus, the first and second trim substrates 10, 12 can be more strongly connected to each other.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A combined board comprising:
   a first board substrate comprising a wood-based natural material and a synthetic resinous material;
   a second board substrate comprising a wood-based natural material and a synthetic resinous material and having a through bore defined therein; and
   a connector pin comprising a synthetic resinous material and received in the through bore of the second board substrate,
   wherein the first board substrate overlaps the second board substrates such that the through bore of the second board substrate is covered by a first surface of the first board substrate, and the connector pin is fusion bonded to a circumferential surface of the through bore and the first surface of the first board substrate.

2. A combined board as defined in claim 1, wherein the connector pin comprises a connector pin having a head portion, and the head portion is also fusion bonded to a first surface of the second board substrate around the through bore.

3. A combined board as defined in claim 1, wherein the wood-based natural material comprises kenaf, and the synthetic resinous material comprises polypropylene.

4. A combined board as defined in claim 1, wherein the connector pin is made from the same synthetic resinous material as the synthetic resinous material contained in the first and second board substrates.

5. A combined board as defined in claim 2, wherein the wood-based natural material comprises kenaf, and the synthetic resinous material comprises polypropylene.

6. A combined board as defined in claim 2, wherein the connector pin includes a bottomed recess that extends therealong.

7. A combined board as defined in claim 6, wherein the wood-based natural material comprises kenaf, and the synthetic resinous material comprises polypropylene.

8. A combined board formed according to a method, the method comprising:

overlapping first and second board substrates such that a through bore formed in the second board substrate is covered by a first surface of the first board substrate, the first and second board substrates each comprising a wood-based natural material and a synthetic resinous material; and feeding a molding material comprising a synthetic resinous material into the through bore of the second board substrate, thereby forming a connector pin in the through bore, and fusion bonding the connector pin to a circumferential surface of the through bore and the first surface of the first board substrate.

* * * * *